US012726408B2

(12) United States Patent
Davidson et al.

(10) Patent No.: US 12,726,408 B2
(45) Date of Patent: Sep. 1, 2026

(54) NETWORK CONFIGURATIONS FOR CLOUD STORAGE SYSTEMS

(71) Applicant: Dell Products L.P., Round Rock, TX (US)

(72) Inventors: Michal Davidson, Beit Shemesh (IL); Shoham Levy, Pardes Hana—Karkur (IL); Matthew P. Jean, Shirley, MA (US)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 18/971,754

(22) Filed: Dec. 6, 2024

(65) Prior Publication Data

US 2026/0163803 A1 Jun. 11, 2026

(51) Int. Cl.

| | |
|---|---|
| ***G06F 15/173*** | (2006.01) |
| ***H04L 41/085*** | (2022.01) |
| ***H04L 41/0895*** | (2022.01) |
| ***H04L 41/14*** | (2022.01) |

(52) U.S. Cl.

CPC ........ *H04L 41/0895* (2022.05); *H04L 41/085* (2013.01); *H04L 41/14* (2013.01)

(58) Field of Classification Search

CPC .... H04L 41/0895; H04L 41/085; H04L 41/14
USPC ........................................................ 709/238
See application file for complete search history.

(56) References Cited

U.S. PATENT DOCUMENTS

| | | | | |
|---|---|---|---|---|
| 9,244,669 | B2 * | 1/2016 | Govindaraju | G06F 8/61 |
| 12,463,873 | B2 * | 11/2025 | Sethi | G06Q 10/0637 |
| 2022/0231952 | A1 * | 7/2022 | Barton | H04L 43/0864 |

* cited by examiner

*Primary Examiner* — Alicia Baturay
(74) *Attorney, Agent, or Firm* — Fogarty LLP

(57) ABSTRACT

Systems and methods provide configuration of cloud systems by detecting a request that specifies virtualized networking and storage resources for a requested cloud system. A network infrastructure payload is generated that specifies the requested virtualized networking resources. The payload is updated with a virtualized networking configuration for the requested system. Based on the virtualized networking implementation, multiple network configurations are identified for implementing the system by a specific cloud provider and candidate network infrastructure payloads are generated for each of the network configurations. A set of tradeoffs are generated between networking and storage parameters of the candidate payloads and the candidate payloads are ranked based on a weighting of the tradeoffs of the respective payloads. A top-ranked of the candidate network infrastructure payloads is updated with specific networking resources to select a cloud provider for implementing the cloud system.

20 Claims, 5 Drawing Sheets

NETWORK CONFIGURATIONS FOR CLOUD STORAGE SYSTEMS

FIELD

The present disclosure relates generally to Information Handling Systems (IHSs), and relates more particularly to the configuration of groups of IHSs arranged into cloud systems.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. Each server IHS within a data center may support a wide variety of possible hardware and software configurations. For instance, each individual server IHS may be manufactured accordingly to customized hardware and software configurations requested by a customer. In some instances, IHSs, such as rack-mounted servers may be grouped into computing clusters that may also include other types of hardware components, such as network switches and power supplies that can enhance the capabilities of the computing cluster.

Through such computing clusters that may span across multiple data centers, cloud systems may support a vast array of computing functions that may be conducted on a personal IHS. For instances, cloud storage systems offer almost any user of any IHS with limitless data storage, regardless of the actual computing or storage capabilities of the IHS. Many aspects of such cloud systems rely on virtualized computing that is conducted using standardized software and hardware, with some hardware being commoditized. Networking in cloud systems, however, is distinct and is not provided in a limitless and virtualized manner.

SUMMARY

In various embodiments, systems and methods provide configuration of a computing cluster comprising a plurality of IHSs (Information Handling Systems). Embodiments may include: detecting a request for configuration of a cloud system, wherein the request specifies virtualized networking and virtualized storage resources to be available for use via the cloud system; generating a network infrastructure payload that specifies the requested virtualized networking resources; updating the network infrastructure payload with a virtualized networking configuration for the requested cloud system; based on the virtualized networking implementation, identifying two or more network configurations for implementing the cloud system by a cloud provider and generating candidate network infrastructure payloads for each of the network configurations; generating a set of tradeoffs between networking and storage parameters of the candidate network infrastructure payloads; ranking each of the candidate network infrastructure payloads based on a weighting of the tradeoffs of the respective payloads; and updating a top-ranked of the candidate network infrastructure payloads with specific networking resources of the cloud provider.

Some embodiments further include duplicating the network infrastructure payload for each cloud provider that can implement the requested cloud system. In some embodiments, the generation of the candidate network infrastructure payloads comprises duplicating the network infrastructure payload for each different candidate network configuration that is supported by the cloud provider. In some embodiments, each of the duplicated network infrastructure payloads are ranked based on the weightings, and wherein the weightings are provided by an issuer of the request for the cloud system. In some embodiments, updating the top-ranked of the candidate network infrastructure payloads with specific networking resources of the cloud provider serves to select the cloud provider for implementing the requested cloud system. In some embodiments, the tradeoffs are generated for each candidate network infrastructure payload relative to each of the other candidate network infrastructure payloads. In some embodiments, the requested virtualized storage resources comprise a software defined storage system that includes a plurality of virtualized instances to be made available. In some embodiments, the requested virtualized storage resources comprise requirements for availability of specific virtualized instances of the software defined storage system. In some embodiments, the requirements for availability of specific virtualized instances of the software defined storage system comprise availability of a specific virtualized instance across subnets specified in the virtualized networking resources of the request. In some embodiments, the requested virtualized networking resources comprise a software defined storage system that includes a plurality of subnets. In some embodiments, the virtualized networking configuration comprises networking configuration settings for all cloud providers that may be used to implement the requested system.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
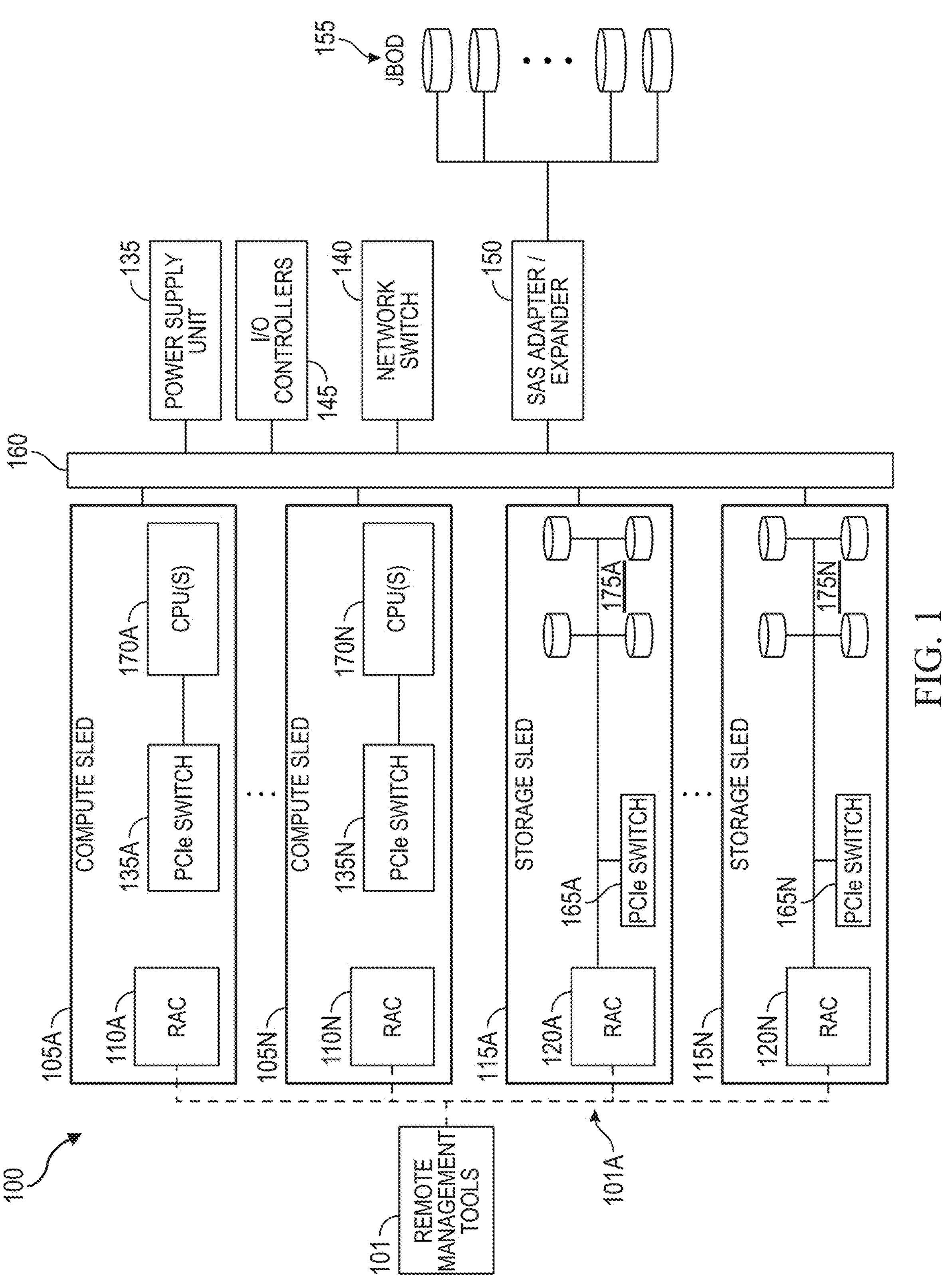
FIG. 1 is a diagram illustrating certain components of a computing cluster, according to some embodiments, that includes multiple IHSs and may be used in implementing a software defined storage system.

FIG. 1 is a block diagram illustrating certain components of a computing cluster 100 comprising one or more compute sleds 105*a-n* and one or more storage sleds 115*a-n* that may be collectively configured to implement the systems and methods described herein for supporting virtualized network configurations in scenarios where these sleds 105*a-n*, 115*a-n* are used in implementing cloud systems, such as software defined storage systems, that rely on virtualized hardware of the computing cluster 100, but that do not utilize actual virtualized network configurations.

In some embodiments, the storage resources 115*a-n*, 155 of a computing cluster 100 may be utilized in implementing cloud systems, such as a software defined storage system that virtualize the underlying storage hardware of the cluster and may provide virtually unlimited storage capacity by utilizing storage resources of multiple computing clusters 100 that may be spread across multiple data centers. When utilized in such a manner, the storage resources 115*a-n*, 155 of the computing cluster 100 are virtualized when configuring a cloud system, such as a software defined storage system. In light of the standardization and commoditization of storage devices, virtualized storage is relatively the same across all cloud providers.

This standardization and virtualization of storage in implementing cloud systems using computing clusters 100 extends to other hardware such as memory, but does not extend in the same regard with regard to networking. Networking capabilities of computing clusters 100 are not virtualized in the same manner as data storage. Accordingly, networking configurations for cloud systems vary significantly between cloud providers, even when the different cloud systems are operating on the same exact computing cluster 100. Embodiments support configuration of virtualized network capabilities of cloud systems and progressive construction of candidate network configurations supported by each of the available cloud providers.

Embodiments of computing cluster 100 may include a wide variety of different hardware configurations. Such variations in hardware configuration may result from computing cluster 100 being factory configured to include components specified by a customer that has contracted for manufacture, provisioning and delivery of the computing cluster 100. Configured in this manner, a computing cluster 100 may be tasked as a single entity that combines the capabilities of the sleds 105*a-n*, sleds 115*a-n* and/or other hardware that is included in the computing cluster 100, such as network switches 140 and power supplies 135.

All of the hardware components of the computing cluster 100 may be installed within a rack 100 may include one or more slots that each receive an individual sled (that may be additionally or alternatively referred to as a server, node and/or blade), such as compute sleds 105*a-n* and storage sleds 115*a-n*. A rack may support a variety of different numbers, sizes (e.g., 1RU, 2RU) and physical configurations of slots. Computing cluster 100 embodiments may support additional types of sleds that may be installed within a rack and provide various types of storage and/or processing capabilities. Sleds may be individually installed and removed from a rack, thus allowing the computing and storage capabilities of a rack, and thus of a computing cluster 100, to be reconfigured, in many cases without affecting the operation of the other hardware installed in the rack.

The modular architecture provided by the rack allows for certain resources, such as cooling, power and network bandwidth, to be shared by the compute sleds 105*a-n* and storage sleds 115*a-n* or other hardware installed in the rack, thus providing efficiency improvements and supporting greater computational loads. Rack may provide all or part of the cooling utilized by sleds 105*a-n*, 115*a-n* of a computing cluster 100. For airflow cooling, a rack may include one or more banks of cooling fans that may be operated to ventilate heated air away from the hardware that is installed within the rack. In some embodiments, rack may include liquid cooling manifolds that can be connected to IHSs or other hardware in providing these components with liquid cooling capabilities.

Figure 2:
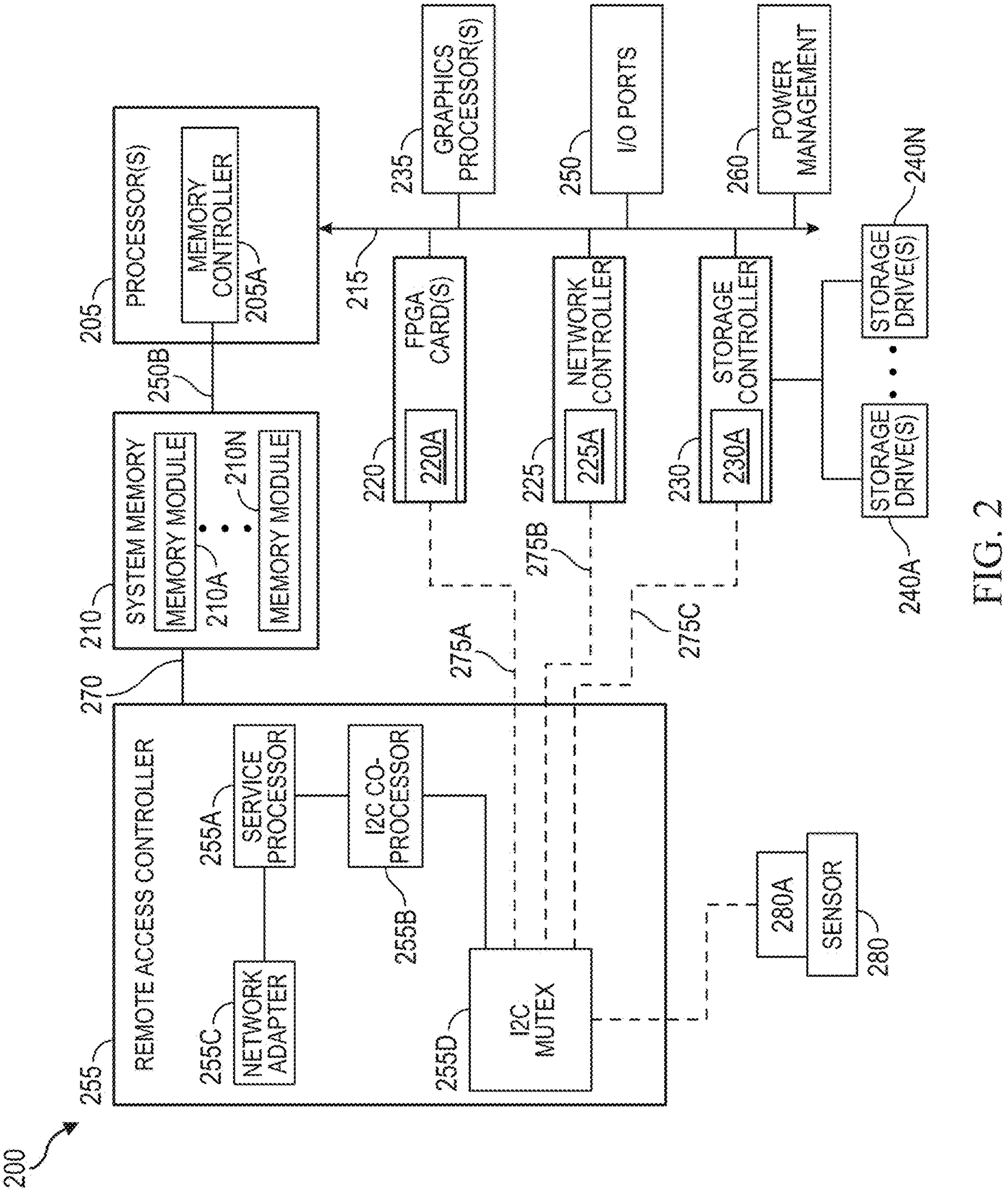
FIG. 2 is a diagram illustrating certain components of an IHS configured, according to some embodiments, for supporting virtualized network configurations when the IHS is used in implementing cloud systems.

In certain embodiments, a compute sled 105*a-n* may be an IHS such as described with regard to IHS 200 of FIG. 2. A compute sled 105*a-n* may provide computational processing resources that may be used to support a variety of e-commerce, multimedia, business and scientific computing applications, such as services provided via a cloud implementation. Compute sleds 105*a-n* are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105*a-n* may be configured for general-purpose computing or may be optimized for specific computing tasks. In some embodiments, a compute sled 105*a-n* may be tasked in full or part in administering and maintaining an SDS that utilizes storage sled 115*a-n* resources of the computing cluster 100.

As illustrated, each compute sled 105*a-n* includes a remote access controller (RAC) 110*a-n*. As described in additional detail with regard to FIG. 2, remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications by compute sled 105*a-n*. Remote access controllers 110*a-n* may collect various types of sensor data, such as collecting temperature sensor readings that are used in support of airflow cooling of the sleds 105*a-n*, 115*a-n*. In addition, each remote access controller 110*a-n* may implement various monitoring and administrative functions related to compute sleds 105*a-n* that utilize sideband bus connections with various internal components of the respective compute sleds 105*a-n*.

Implementing computing clusters 100 that span multiple processing components (e.g., 105*a-n*, 115*a-n*) may be aided by high-speed data links between these processing components, such as PCIe connections that form one or more distinct PCIe switch fabrics 160 that may implemented by network switches 140 and PCIe switches 135*a-n*, 165*a-n* installed in the IHSs 105*a-n*, 115*a-n* that are members of the computing cluster 100. These high-speed data links may be used to support software that operates spanning multiple processing, networking and storage components of a computing cluster 100. In embodiments, a computing cluster 100 may be tasked and operated as a single component, without regard to the individual hardware components that are members of the computing cluster 100.

In some embodiments, these networking capabilities of the computing cluster 100 may be used to implement a cloud system, such as a Software Defined Storage (SDS) system that utilizes storage sled 115*a-n* and/or Just a Bunch Of Disks (JBOD) 155 resources of the computing cluster 100. Whereas the storage resources of sleds 115*a-n*, 155 may be virtualized with respect to the SDS system, these networking capabilities of the computing cluster 100 may also be virtualized, but each different cloud provider may virtualize them differently, with each different virtualization scheme providing different functionality and limitations and cost. Once implemented, these differing virtualized networking capabilities of each cloud provider may then rely on specific capabilities of networking hardware of a computing systems, such as specific PCIe switch 135*a-n*, 165*a-n* capabilities. Different cloud providers may utilize these network capabilities of the computing cluster 100 differently, thus complicating the network configuration of a cloud system, such as an SDS system. As described in additional detail below, embodiments support configuration of virtualized storage via an SDS on different types of cloud networks while specifying uniform network requirements for network configurations that are virtualized differently by the different cloud providers.

As illustrated, computing cluster 100 may also include one or more storage sleds 115*a-n* that may be installed within one or more slots of a rack, in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. As illustrated, each storage sled 115*a-n* includes a remote access controller (RAC) 120*a-n* provides capabilities for remote monitoring and management of respective storage sleds 115*a-n*. In some embodiments, each of the storage sleds 115*a-n* may include a PCIe switch 165*a-n* for use in coupling the sleds to a switch fabric 160, by which the storage sleds may interface with other members of the computing cluster 100. In some embodiments, each storage sled 115*a-n* may be uniquely identified based on a code or other identifier that may be permanently encoded in a non-volatile memory of the respective storage sled 115*a-n* by its manufacturer. In some embodiments, a storage sled 115*a-n* may be tasked in full or part to provide virtualized data storage that is available within an SDS system that may span one or more computing clusters 100.

The remote access controllers 110*a-n*, 120*a-n* that are present in a computing cluster 100 may support secure connections with remote management tools 101. In some embodiments, remote management tools 101 provides a remote administrator, whether manual or automated, with various capabilities for remotely administering the operation of an individual IHS or of the computing cluster 100, including initiating updates to the software and hardware operating in the cluster. The remote management tools 101 may also include various monitoring interfaces for evaluating telemetry data collected by the remote access controllers 110*a-n*, 120*a-n*. In some embodiments, remote management tools 101 may communicate with remote access controllers 110*a-n*, 120*a-n* via a protocol such the Redfish remote management interface.

As described in additional detail below, through the operation of remote management tools 101, a human and/or automated administrator may generate a request for a cloud solution, such as software defined storage system. Through embodiments, such requests may be specified through the use of virtualized network configurations and virtualized storage configurations, despite the cloud providers utilizing network configurations that may be virtualized, but are non-standardized and virtualized differently by different cloud providers. In addition, through the use of network infrastructure payloads by embodiments, the remote access tools 101 may be used in selecting and refining the cloud-specific network configuration that is selected for implementation.

As illustrated, the computing cluster 100 of FIG. 1 includes a network switch 140 that may provide network access to the sleds 105*a-n*, 115*a-n* of the cluster. Network switch 140 may include various switches, adapters, controllers and couplings used to connect computing cluster 100 to a network and/or to local IHSs, such as another computing cluster 100 according to embodiments. Whereas the illustrated embodiment of FIG. 1 includes a single network switch in a computing cluster 100, different embodiments may operate using different numbers of network switches.

In some embodiments, network switch 140 may be a PCIe switch that implements switch fabric 160 and operates as an I/O controller for PCIe communications, such as TLPs (Transaction Layer Packets), that are transmitted between the hardware components (e.g., compute sleds 105*a-n* and storage sleds 115*a-n*) that are members of the same computing cluster 100. In addition to serving as I/O controllers that route PCIe traffic, a PCIe network switch 140 includes switching logic that can be used to expand the number of PCIe connections that are supported in the switch fabric 160. For instance, a PCIe network switch 140 may multiply the number of PCIe lanes available via the switch fabric 160. Such capabilities may be utilized in implementing virtualized storage instances that are maintained and made accessible by an SDS system. In some embodiments, the PCIe switch may be used to establish channels through which computing cluster network capabilities may be evaluated in support of the selection of network configuration options used by cloud providers that are relying on virtualized storage provided using data storage 115*a-n* capabilities of the computing cluster 100.

In some embodiments, computing cluster 100 may include one or more power supply units 135 that provides the components of the computing cluster with various levels of DC power from an AC power source or from power delivered via a power system that may be provided by a rack within which the computing cluster 100 is installed. In certain embodiments, power supply unit 135 may be implemented within a sled that may provide the computing cluster 100 with multiple redundant, hot-swappable power supply units. In some embodiments, a power supply unit 135 may be uniquely identified based on a code or other identifier that may be permanently encoded in a non-volatile memory of the power supply unit 135 by its manufacturer.

In addition to the data storage capabilities provided by storage sleds 115*a-n*, computing cluster 100 include other storage resources that may be installed within a rack housing the computing cluster 100, such as within a storage blade. In certain scenarios, such storage resources 155 may be accessed via a SAS expander 150 that is coupled to the switch fabric 160 of the computing cluster 100. The SAS expander 150 may support connections to a number of JBOD storage drives 155 that may be configured and managed individually and without implementing data redundancy across the various drives 155. In some embodiments, the data storage resources 155 of a JBOD accessed by the computing cluster 100 may be utilized in a virtualized manner by cloud systems, such as software defined storage systems.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting virtualized network configurations when the IHS is used in implementing cloud systems, such as software defined storage systems. It should be appreciated that although the embodiments described herein may describe an IHS that is a compute sled or similar computing component that may be deployed within slots of a rack, other embodiments may be utilized with other types of IHSs that may also be members of a computing cluster 100 according to embodiments. In the illustrative embodiment of FIG. 2, IHS 200 may be a computing component, such as compute sled 105 *a-n* or other type of server, such as an 1RU server installed within a 2RU chassis, that is configured to share infrastructure resources provided by a rack.

As described, an IHS 200 may be assembled and provisioned according to customized specifications provided by a customer. The IHS 200 of FIG. 2 may be a compute sled, such as compute sleds 105*a-n* of FIG. 1, that may be installed within a rack in a data center. Installed in this manner, IHS 200 may utilize shared power, network and cooling resources provided by the rack. Embodiments of IHS 200 may include a wide variety of different hardware configurations. Such variations in hardware configuration may result from IHS 200 being factory assembled to include components specified by a customer that has contracted for manufacture and delivery of IHS 200. IHS 200 may include capabilities that allow a customer to validate that the hardware components of IHS 200 are the same hardware components that were installed at the factory during its manufacture, where these validations of the IHS hardware may be initially completed using a factory-provisioned inventory certificate. As described in additional detail below, IHS 200 may include capabilities that allow a customer to validate the hardware during initialization of the IHS 200 as being the same factory installed and provisioned hardware that was supplied to the customer.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205*a* that may be implemented directly within the circuitry of the processor 205, or the memory controller 205*a* may be a separate integrated circuit that is located on the same die as the processor 205. The memory controller 205*a* may be configured to manage the transfer of data to and from the system memory 210 of the IHS 205 via a high-speed memory interface 205*b*. The system memory 210 is coupled to processor(s) 205 via a memory bus 205*b* that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220*a* that may support interoperation with the remote access controller 255 via a sideband device management bus 275*a*.

Processor(s) 205 may also be coupled to one or more network controllers 225 via in-band bus 215, such as provided by a Network Interface Controller (NIC) that allows the IHS 200 to communicate via an external network, such as the Internet or a LAN. In some embodiments, network controllers 225 may include a replaceable expansion card or adapter that is coupled to a motherboard connector of IHS 200. In some embodiments, a network controller 225 may be a PCIe switch, such as PCIe switches 165*a-n* described in computing cluster 100, while in other embodiments, the network controllers 255 of IHS 100 may include both a PCIe switch and a separate ethernet network controller. As described, a PCIe switch may be used by the IHS 200 to interface with other members of a computing cluster 100 via a switch fabric 160, such as the use of a selected PCIe lane for cluster management communications used in the collective management of the computing cluster.

In some embodiments, the network capabilities of PCIe switches 165*a-n* and network controllers 255 may be utilized in implementing cloud systems, such as software defined storage systems. In many instances, the network configurations of PCIe switches 165*a-n* and network controllers 255 may vary significantly between different cloud providers through which the cloud system is configured. As described in additional detail below, in embodiments may interface with PCIe switches 165*a-n* and network controllers 255 in evaluating the network capabilities offered by the different cloud providers that may be used for implementing a cloud system.

IHS 200 may include one or more storage controllers 230 that may be utilized to access storage drives 240*a-n* that are accessible via a rack in which IHS 100 is installed. Storage controller 230 may provide support for RAID (Redundant Array of Independent Disks) configurations of logical and physical storage drives 240*a-n*. In some embodiments, storage controller 230 may be an HBA (Host Bus Adapter) that provide more limited capabilities in accessing physical storage drives 240*a-n*. In some embodiments, storage drives 240*a-n* may be replaceable, hot-swappable storage devices that are installed within bays provided by the chassis in which IHS 200 is installed. In embodiments where storage drives 240*a-n* are hot-swappable devices that are received by bays of chassis, the storage drives 240*a-n* may be coupled to IHS 200 via couplings between the bays of the chassis and a midplane of IHS 200. In some embodiments storage drives 240*a-n* may also be accessed by other IHSs that are also installed within the same chassivs as IHS 100. Storage drives 240*a-n* may include SAS (Serial Attached SCSI) magnetic disk drives, SATA (Serial Advanced Technology Attachment) magnetic disk drives, solid-state drives (SSDs) and other types of storage drives in various combinations.

A variety of additional components may be coupled to processor(s) 205 via in-band bus 215. For instance, processor(s) 205 may also be coupled to a power management unit 260 that may interface with the power system unit 135 of the computing cluster 100 in which an IHS may be a member.

In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state).

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200.

In support of the capabilities for validating the detected hardware components of IHS 200 against the inventory information that is specified in a signed inventory certificate, remote access controller 255 may include various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiments, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a-c* that may be individually established with each of the respective managed devices 220, 225, 230, 280 through the operation of an I2C multiplexer 255*d* of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275*a-c* used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255*a* of remote access controller 255 may rely on an I2C co-processor 255*b* to implement sideband I2C communications between the remote access controller 255 and managed components 220, 225, 230, 280 of the IHS. The I2C co-processor 255*b* may be a specialized co-processor or micro-controller that is configured to interface via a sideband I2C bus interface with the managed hardware components 220, 225, 230, 280 of IHS. In some embodiments, the I2C co-processor 255*b* may be an integrated component of the service processor 255*a*, such as a peripheral system-on-chip feature that may be provided by the service processor 255*a*. Each I2C bus 275*a-c* is illustrated as single line in FIG. 2. However, each I2C bus 275*a-c* may be comprised of a clock line and data line that couple the remote access controller 255 to I2C endpoints 220*a*, 225*a*, 230*a*, 280*a* which may be referred to as modular field replaceable units (FRUs).

As illustrated, the I2C co-processor 255*b* may interface with the individual managed devices 220, 225, 230, 280 via individual sideband I2C buses 275*a-c* selected through the operation of an I2C multiplexer 255*d*. Via switching operations by the I2C multiplexer 255*d*, a sideband bus connection 275*a-c* may be established by a direct coupling between the I2C co-processor 255*b* and an individual managed device 220, 225, 230, 280. In providing sideband management capabilities, the I2C co-processor 255*b* may each interoperate with corresponding endpoint I2C controllers 220*a*, 225*a*, 230*a*, 280*a* that implement the I2C communications of the respective managed devices 220, 225, 230. The endpoint I2C controllers 220*a*, 225*a*, 230*a*, 280*a* may be implemented as a dedicated microcontroller for communicating sideband I2C messages with the remote access controller 255, or endpoint I2C controllers 220*a*, 225*a*, 230*a*, 280*a* may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
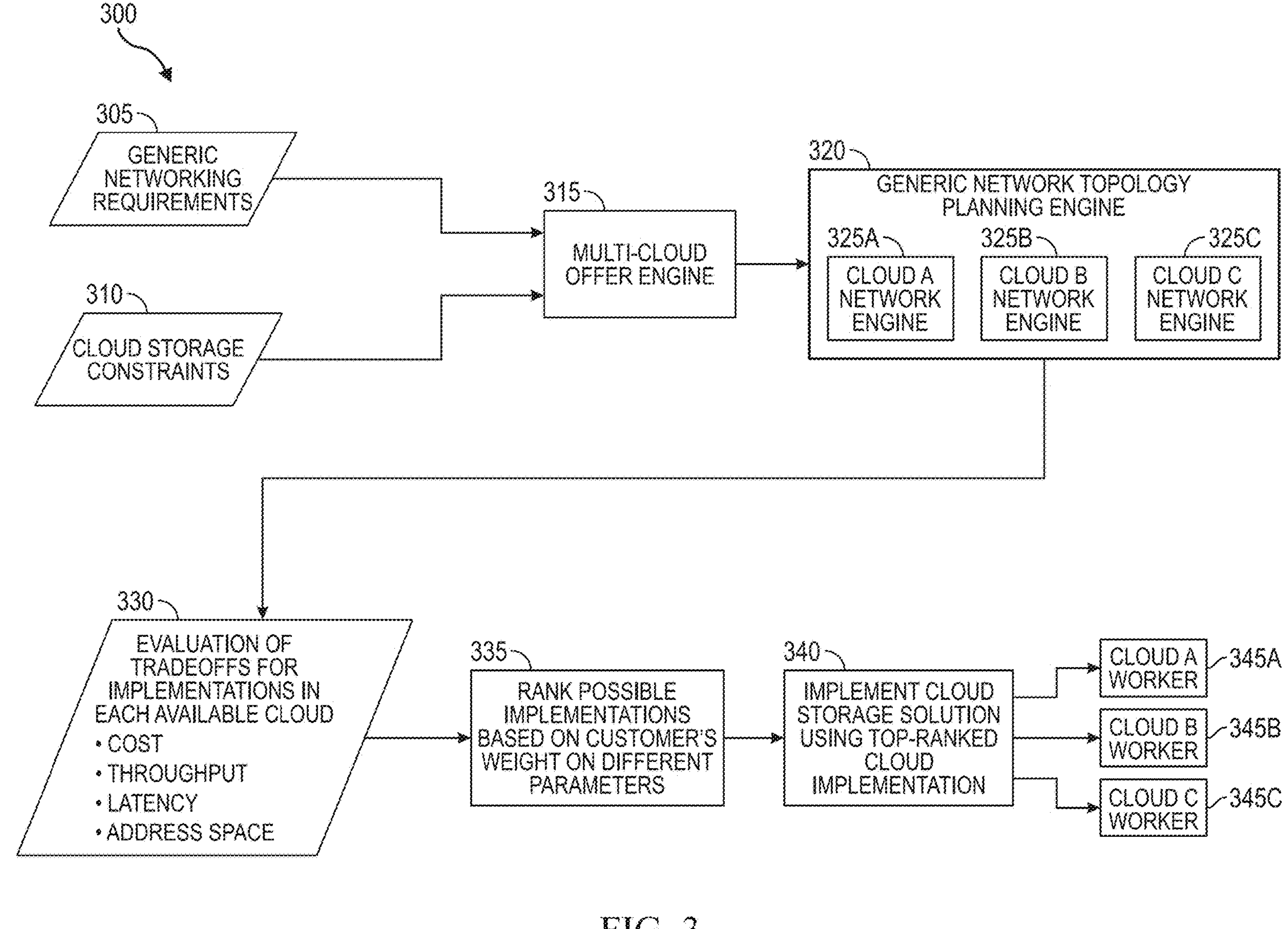
FIG. 3 is a diagram illustrating certain components of a system configured, according to some embodiments, for supporting virtualized network configurations when implementing cloud systems.

FIG. 3 is a diagram illustrating certain steps of a process 300, according to some embodiments, for supporting the use of virtualized network configurations when implementing cloud systems, such as software defined storage systems. Some embodiments of the network configuration process 300 may begin with a user or system specifying a request for implementation of a specific cloud system, where the request for the cloud system includes, at 305, a set of virtualized networking requirements and, at 310, a set of virtualized cloud storage requirements.

In some embodiments, the virtualized networking requirements 305 and virtualized data storage requirements 310 that are set forth in a request for a cloud system, such as a software defined storage system, may be met by multiple cloud providers that support the requested cloud system. As described, the storage requirements for a cloud system, such as an SDS system, may be set forth though virtualized storage requests. In some embodiments, virtualized storage requirements 310 of a cloud system request may specify various logical instances, such as logical volumes, virtual disks, containers of storage, storage services, virtualized clusters, file system, backup, snapshot, etc.

Once created, such instances may be managed by the SDS system, which virtualizes the underlying physical storage resources of the computing cluster 100. For such aspects of cloud systems, virtualization has been standardized, thus allowing such storage requirements 310 to be specified in a manner that can be readily adapted for implementation by multiple different cloud providers. Networking aspects of cloud systems are not standardized and virtualized in the same manner. Accordingly, even though the network requirements 305 may be specified through embodiments in the request in virtualized form, a virtualized description of a network infrastructure cannot be directly used in implementing a cloud system through any of the cloud providers, which each utilize their own bespoke network configurations.

Figure 4:
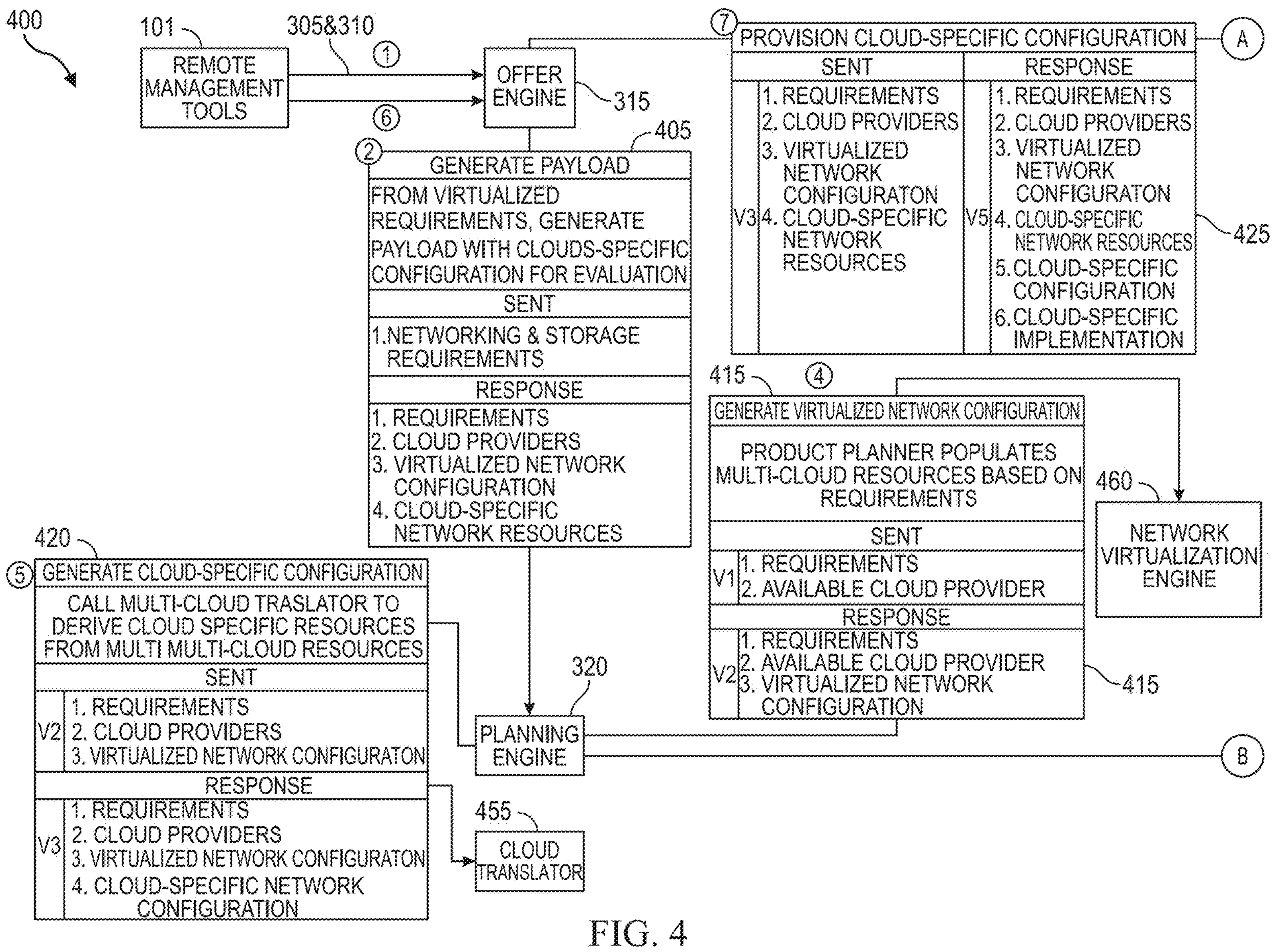
FIG. 4 is a diagram illustrating certain components of a system and certain steps of methods, according to some embodiments, for supporting virtualized network configurations when implementing cloud systems.
Figure 4:
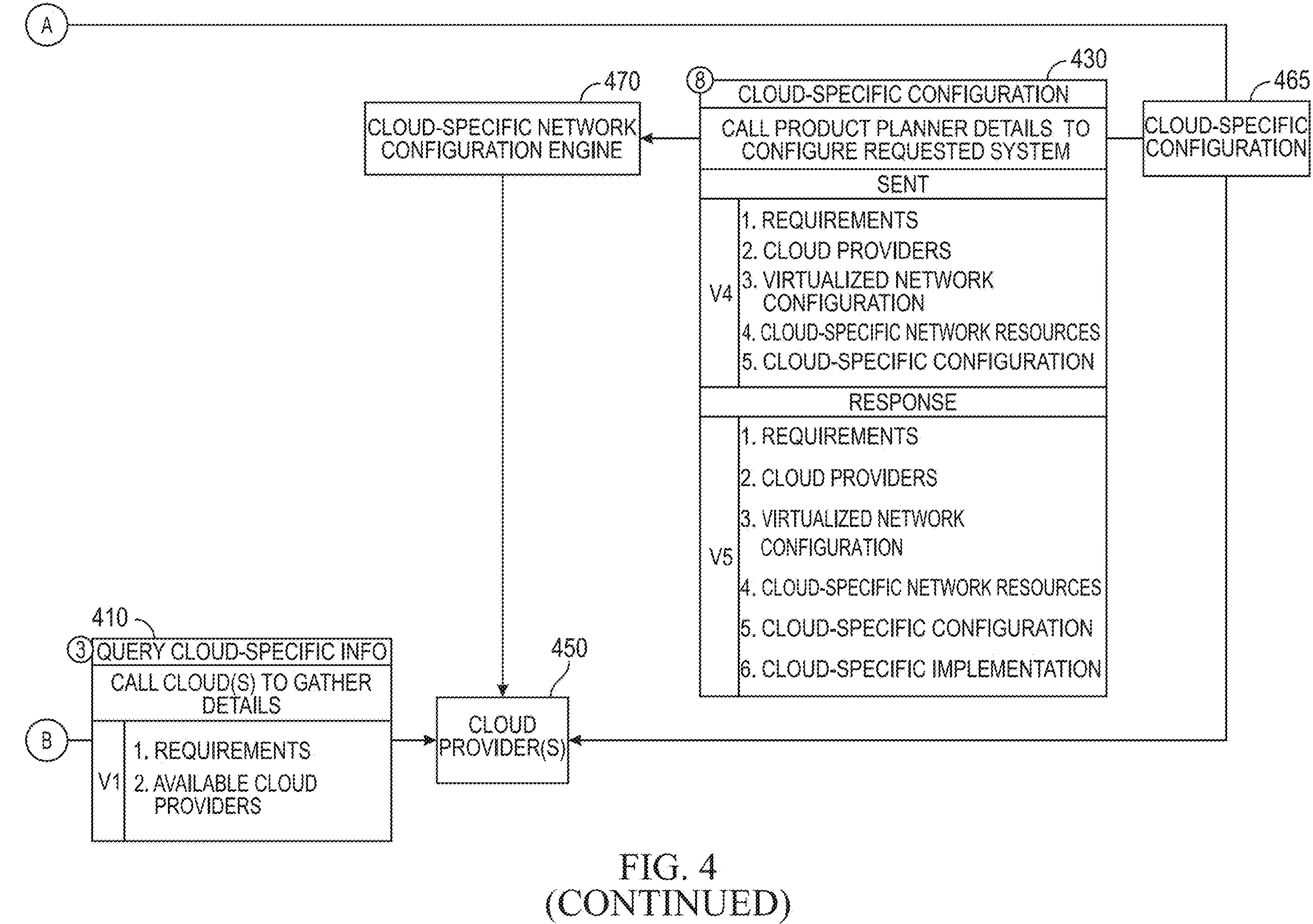

FIG. 4 is a diagram illustrating certain components of a system and certain steps of methods, according to some embodiments, for supporting virtualized network configurations when implementing cloud systems, such as software defined storage systems. In FIG. 4, a request for implementation of a cloud system, such as a software defined storage system, may be issued via remote management tools 101, where the request may be generated by a human datacenter administrator, an automated administrator, or any combination of the two. As indicated in FIG. 4, the request specifies virtualized networking requirements 305 and virtualized data storage requirements 310 for the requested system.

Also as indicated in FIG. 4, once the set of virtualized networking and data storage requirements 305, 310 have been identified, this information is evaluated by a multi-cloud offer engine 315 that begins the identification of the cloud providers that are capable of supporting the requested cloud system, and also generates a set of storage and networking tradeoffs between the different cloud system network configurations that are candidates for implementing the request.

In some instances, all known cloud providers may be able to support the requested cloud system. In some instances, a human administrator may select the cloud provider to be used in implementing the requested cloud system. In scenarios where only a single cloud provider is available or has been selected a priori, embodiments may still evaluate networking and storage tradeoffs between different network configurations that are supported by that cloud provider. In instances where multiple cloud providers are available for implementing a cloud system, embodiments may evaluate networking and storage tradeoffs for each configuration supported by each individual cloud provider, as well as networking and storage tradeoffs between the different cloud provider configurations.

In implementing the evaluation of such tradeoffs between different candidate cloud implementations, at 405, embodiments may generate a network infrastructure payload in constructing, evaluating, revising and implementing the different network configurations that may be utilized in the candidate implementations. As described, embodiments support requests that specify network requirements in virtualized form. In some embodiments, the initial network infrastructure payload for the requested cloud system may specify a virtualized network infrastructure using a structured format, such as a JSON or a DSL (Domain Specific Language), that is capable of representing all network configurations offered by all of the cloud providers that are deemed, at 410, as capable of providing the requested cloud system.

In scenarios where the cloud providers utilize a computing cluster 100 configured according to embodiments, a structured format for virtualized networking configurations may be generated based on the union of networking capabilities of the computing cluster 100 that are utilized and separately virtualized by each of the cloud providers that are capable of providing the requested cloud system, since the provider of the computing cluster 100 is aware of it's networking capabilities that are allocated for use by different cloud providers, such as through service level agreements. As indicated in FIG. 4, at 410, the network infrastructure payload is generated and populated with virtualized network requirements that were part of the request and is also populated with details of the cloud provider(s) that are capable of providing the requested system. In some embodiments, at 410, the network infrastructure payload is duplicated and populated for each separate cloud provider that is capable of providing the requested system.

Once the cloud providers that are available for implementing the requested cloud system have been identified, the network topology engine 320 begins evaluation of candidate network configurations for each of the cloud providers. As illustrated, at 415, a virtualized network configuration is generated for each of the network infrastructure payloads that have been generated for each of the candidate cloud providers. This virtualized network configuration may be generated using the structured format described above and may specify generalized network configurations that are not directly usable by any of the supported cloud providers, such as specifying one or more subnets to be utilized and zones in which each subnet is to be made available.

As indicated in FIG. 4, through such evaluations, at 415, the network infrastructure payload is further updated with a multi-cloud virtualized network configuration, such as the described subnets and availability requirements that are applicable for all of the cloud providers, but are not directly usable in configuring a cloud system by any of the providers. This procedure may be repeated for each network infrastructure payload that has been generated for each of the cloud providers, and/or for each distinct solution by the same cloud provider. The network infrastructure payload that has been updated with a virtualized network configuration is then returned to the planning engine 320, which further updates the network infrastructure payload, at 420, with a cloud-specific network configuration.

Some embodiments may rely on one or more cloud translators 455 that are used to convert the virtualized network configuration to a high-level set of network resources of a specific cloud provider 450 that has been confirmed as a candidate for implementation of the requested cloud system. Using outputs generated by one or more cloud-specific translators 455, the network infrastructure payload is updated with a set of cloud-specific network resources for use in implementing the requested cloud system. Whereas the virtualized network configuration may refer to subnets and availability in a general sense, the cloud-specific network resources specify specific subnet constructs and availability settings used by a specific cloud provider 450.

As indicated in FIG. 3, for each of the network infrastructure payloads that have been generated to include a candidate cloud-specific network configuration, at 330, a set of tradeoffs are calculated between the different possible implementations. In some instances, one of the tradeoffs may include the cost to implement the candidate cloud-specific network configuration relative to the cost of other candidate network configurations. Another of the tradeoffs that may be calculated for each cloud-specific network configuration is the data throughput that may be supported relative to other candidate network configurations. Similarly, tradeoffs in the latency for data operations may be calculated relative to other candidate network configurations. Also as indicated in FIG. 3, tradeoffs may be calculated with regard to the data storage address space that is required to support each candidate network configuration.

Once tradeoffs have been calculated for each of the candidate network configurations, the network infrastructure payloads may be ranked according to these tradeoffs. As reflected at 335 of FIG. 3, the network infrastructure payloads may be ranked according to preferences set by the user or system that has requested implementation of the cloud system. Whereas some scenarios may specify cost as the prevailing factor by which the network infrastructure payloads are to be ranked, in other scenarios where timely availability of the hosted data is of great importance (e.g., to support access to video data with minimal buffering), latency may be the most preferred factor in ranking the candidate network configurations. In other scenarios, providing availability of the hosted data to a large number of concurrent users may be of great importance such that throughput may be the most preferred factor in ranking the candidate solutions. In other scenarios, the cost of additional, ongoing long-term data storage needed to support a software defined storage system is undesirable such that minimizing the long-term cost of address space is of greater importance than the short-term cost of a networking solution that only charges based on utilized bandwidth.

As indicated in FIG. 4, in some embodiments, the evaluation of such tradeoffs may be conducted via the offer engine 315 via inputs provided via remote management tools 101. In some embodiments, a human or automated administrator may evaluate the candidate network configurations from each of the network infrastructure payloads and may be provided with the tradeoffs of each candidate configuration and also with the rankings of these tradeoffs. As indicated in FIG. 4, based on confirmation of the human or automated administrator, the network infrastructure payload of the highest ranked candidate cloud-specific network configuration is selected by the offer engine 315 for updating with the selected cloud provider implementation.

This updating of the network infrastructure payload, at 425, converts the high-level cloud-specific network resources from the payload to a detailed cloud-specific network configuration that includes the selection of cloud-specific options, such as for logical sub-groupings such as subnets and availability of such sub-groupings, such as through load balancing or special designations for certain subnets. As indicated in FIG. 4, the network infrastructure payload may be forwarded to a cloud-specific configuration engine 465, such as one of cloud-specific 345*a-c* configuration engines of FIG. 3, that takes the high-level network resources and uses this information to generate the detailed cloud-specific network configuration that is added to the network infrastructure payload.

As indicated in FIG. 4, the updated network infrastructure payload is forwarded to a cloud-specific network configuration engine 470 that provides the complete implementation details for the selected network configuration. As indicated, these cloud-specific implementation details are added to the network infrastructure payload, such that the payload now includes specific references to the proposed, or in some instances completed, network implementation by the requested cloud system. Also as indicated, once the network infrastructure payload has been updated, it is returned to the remote management tools 101 that issued the request.

Based on the updated network infrastructure payload that is returned, the remote management tools are provided with detailed information regarding the selected network implementation, as well as higher-level descriptions of the cloud-specific network configuration, and also with a description of the implementation using virtualized network resource information, as well as the requirements from which this virtualized network resource information has been generated. Prior to confirming the implementation presented in the updated network infrastructure payload, the human and/or automated administrator may evaluate the procedures and information that is included in the payload and that has been used in generating and selecting the implementation.

In some embodiments, any rejection of the selected implementation may result in a request for the human and/or automated administrator to identify one or more aspects of the network infrastructure payload that are deemed incorrect or otherwise undesirable with respect to the candidate network configuration that has been selected. For instance, the administrator may reject use of certain cloud providers 450 or of certain types of network configurations, such as the use of a selected load balancing feature, thus reducing the network infrastructure payloads that may be available for consideration. However, re-evaluation of the generated network infrastructure payloads while excluding the rejected cloud provider and/or setting results in the calculation of relative tradeoffs between the remaining network infrastructure payloads. In this same manner, the administrator may reject a specific subnet configuration, such as rejecting the subnet configuration as providing insufficient availability. In some embodiments, the network infrastructure payload may be reverted to a prior state, such as at 425, and may adjust the cloud-specific network load balancing configuration that is input to the configuration engine 465, thus generating a different cloud-specific implementation for consideration. In this manner, the network infrastructure payload may be refined or otherwise updated, through additions and through reversions, in order to generate a cloud-specific network configuration from virtualized network information that is used to request a cloud system.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for configuration of a computing cluster comprising a plurality of Information Handling Systems (IHSs), the method comprising:

detecting a request for configuration of a cloud system, wherein the request specifies virtualized networking and virtualized storage resources to be available for use via the cloud system;

generating a network infrastructure payload that specifies the requested virtualized networking and virtualized storage resources;

updating the network infrastructure payload with a virtualized networking configuration for the cloud system;

based on the virtualized networking configuration, identifying two or more network configurations for implementing the cloud system by a cloud provider and generating candidate network infrastructure payloads for each of the network configurations;

generating a set of tradeoffs between networking and storage parameters of the candidate network infrastructure payloads;

ranking each of the candidate network infrastructure payloads based on a weighting of the tradeoffs of the respective payloads;

updating a top-ranked payload of the candidate network infrastructure payloads with specific networking resources of the cloud provider; and implementing the cloud system based at least in part on the top-ranked candidate network infrastructure payload.

2. The method of claim 1, further comprising duplicating the network infrastructure payload for each cloud provider that can implement the requested cloud system.

3. The method of claim 1, wherein the generation of the candidate network infrastructure payloads comprises duplicating the network infrastructure payload for each different candidate network configuration that is supported by the cloud provider.

4. The method of claim 3, wherein each of the duplicated network infrastructure payloads are ranked based on the weightings, and wherein the weightings are provided by an issuer of the request for the cloud system.

5. The method of claim 1, wherein updating the top-ranked of the candidate network infrastructure payloads with specific networking resources of the cloud provider serves to select the cloud provider for implementing the requested cloud system.

6. The method of claim 1, wherein the tradeoffs are generated for each candidate network infrastructure payload relative to each of the other candidate network infrastructure payloads.

7. The method of claim 1, wherein the requested virtualized storage resources comprise a software defined storage system that includes a plurality of virtualized instances to be made available.

8. The method of claim 7, wherein the requested virtualized storage resources comprise requirements for availability of specific virtualized instances of the software defined storage system.

9. The method of claim 8, wherein the requirements for availability of specific virtualized instances of the software defined storage system comprise availability of a specific virtualized instance across subnets specified in the virtualized networking resources of the request.

10. The method of claim 1, wherein the requested virtualized networking resources comprise a software defined storage system that includes a plurality of subnets.

11. The method of claim 1, wherein the virtualized networking configuration comprises networking configuration settings for all cloud providers that may be used to implement the requested system.

12. An Information Handling System (IHS) comprising:

one or more processors; and one or more memory devices coupled to the one or more processors, the one or more memory devices configured with stored computer-readable instructions that, upon execution by the one or more processors, cause the IHS to:

detect a request for configuration of a cloud system, wherein the request is configured to specify virtualized networking and virtualized storage resources to be available for use via the cloud system;

generate a network infrastructure payload that is configured to specify the requested virtualized networking resources;

update the network infrastructure payload with a virtualized networking configuration for the cloud system;

based on the virtualized networking configuration, identify two or more network configurations to implement the cloud system by a cloud provider and generate candidate network infrastructure payloads for each of the network configurations;

generate a set of tradeoffs between networking and storage parameters of the candidate network infrastructure payloads;

rank each of the candidate network infrastructure payloads based on a weighting of the tradeoffs of the respective payloads;

update a top-ranked payload of the candidate network infrastructure payloads with specific networking resources of the cloud provider; and implement the cloud system based at least in part on the top-ranked candidate network infrastructure payload.

13. The IHS of claim 12, wherein the tradeoffs are generated for each candidate network infrastructure payload relative to each of the other candidate network infrastructure payloads.

14. The IHS of claim 12, wherein the requested virtualized storage resources comprise a software defined storage system that includes a plurality of virtualized instances to be made available.

15. The IHS of claim 12, wherein the requested virtualized networking resources comprise a software defined storage system that includes a plurality of subnets.

16. The IHS of claim 12, wherein the virtualized networking configuration comprises networking configuration settings for all cloud providers that may be used to implement the requested system.

17. A computer-readable storage device configured with instructions stored thereon for management of a computing cluster by an Information Handling System (IHS), wherein execution of the instructions by one or more processors causes the IHS to:

determine when addition of a second IHS as a member of the computing cluster would require an update to a cluster identifier that is used to task the computing cluster;

detect a request for configuration of a cloud system, wherein the request specifies virtualized networking and virtualized storage resources to be available for use via the cloud system;

generate a network infrastructure payload that specifies the requested virtualized networking resources;

update the network infrastructure payload with a virtualized networking configuration for the cloud system;

based on the virtualized networking configuration, identify two or more network configurations to implement the cloud system by a cloud provider and generate candidate network infrastructure payloads for each of the network configurations;

generate a set of tradeoffs between networking and storage parameters of the candidate network infrastructure payloads;

rank each of the candidate network infrastructure payloads based on a weighting of the tradeoffs of the respective payloads;

update a top-ranked payload of the candidate network infrastructure payloads with specific networking resources of the cloud provider; and implement the cloud system based at least in part on the top-ranked candidate network infrastructure payload.

18. The computer-readable storage device of claim 17, wherein the tradeoffs are generated for each candidate network infrastructure payload relative to each of the other candidate network infrastructure payloads.

19. The computer-readable storage device of claim 17, wherein the requested virtualized storage resources comprise a software defined storage system that includes a plurality of virtualized instances to be made available.

20. The computer-readable storage device of claim 17, wherein the requested virtualized networking resources comprise a software defined storage system that includes a plurality of subnets.

* * * * *